United States Patent
Wybo et al.

(10) Patent No.: US 11,904,726 B2
(45) Date of Patent: Feb. 20, 2024

(54) AUXILIARY POWER SYSTEM AND METHOD

(71) Applicant: GM GLOBAL TECHNOLOGY OPERATIONS LLC, Detroit, MI (US)

(72) Inventors: Steven V. Wybo, Grosse Pointe Park, MI (US); Ranya Badawi, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 290 days.

(21) Appl. No.: 17/567,369

(22) Filed: Jan. 3, 2022

(65) Prior Publication Data

US 2023/0211703 A1    Jul. 6, 2023

(51) Int. Cl.
*B60L 58/20* (2019.01)
*B60L 53/20* (2019.01)

(52) U.S. Cl.
CPC .............. *B60L 58/20* (2019.02); *B60L 53/20* (2019.02); *B60L 2210/10* (2013.01)

(58) Field of Classification Search
CPC ...... B60L 58/20; B60L 53/20; B60L 2210/10; B60L 1/02; B60L 1/14; B60L 1/00; G01R 21/06; G01R 21/133; H02M 1/32; H02M 3/335–3/33592
See application file for complete search history.

(56) References Cited

U.S. PATENT DOCUMENTS

| | | | | |
|---|---|---|---|---|
| 8,279,642 | B2 * | 10/2012 | Chapman | H02J 3/38 363/39 |
| 9,853,589 | B2 * | 12/2017 | Jing | B60L 15/02 |
| 10,538,167 | B2 * | 1/2020 | Oguma | B60L 7/14 |
| 2006/0062034 | A1 * | 3/2006 | Mazumder | H02M 7/4807 363/131 |
| 2009/0015199 | A1 * | 1/2009 | Kitanaka | H02J 7/00309 320/118 |
| 2011/0026282 | A1 * | 2/2011 | Chapman | H02M 1/12 363/65 |
| 2012/0032517 | A1 * | 2/2012 | Ido | H02M 3/3376 307/77 |
| 2012/0181854 | A1 * | 7/2012 | Gopalakrishnan | B60L 58/20 307/9.1 |

(Continued)

*Primary Examiner* — Daniel Cavallari
*Assistant Examiner* — Brian K Baxter
(74) *Attorney, Agent, or Firm* — Quinn IP Law

(57) ABSTRACT

An accessory power system includes an accessory power module having primary power switches, a transformer, and secondary rectifiers. The primary power switches are electrically connected to the high-voltage bus, and the secondary rectifiers are electrically connected to the low-voltage bus. A peak detector is coupled to the high-voltage bus. A controller is in communication with the peak detector circuit, and operatively connected to the primary power switches. The controller dynamically monitors, via the peak detector circuit, a ripple voltage of the high-voltage bus, compares the monitored voltage with a maximum threshold voltage, and disables the plurality of primary power switches when the ripple voltage of the high-voltage bus is greater than the maximum threshold voltage, and reactivates the primary power switches when the ripple voltage of the high-voltage bus is less than the maximum threshold voltage.

20 Claims, 2 Drawing Sheets

(56) References Cited

U.S. PATENT DOCUMENTS

| | | | |
|---|---|---|---|
| 2014/0254206 A1* | 9/2014 | Ou | H02M 3/33592 |
| | | | 363/21.01 |
| 2016/0006365 A1* | 1/2016 | Perreault | H02M 1/4208 |
| | | | 363/89 |
| 2016/0236580 A1* | 8/2016 | Hou | B60L 58/20 |
| 2018/0029479 A1* | 2/2018 | Wang | B60L 53/00 |
| 2018/0069480 A1* | 3/2018 | Koo | H02M 3/33523 |
| 2023/0010616 A1* | 1/2023 | Gschwantner | B60L 58/20 |
| 2023/0027762 A1* | 1/2023 | Park | B60L 53/20 |

* cited by examiner

AUXILIARY POWER SYSTEM AND METHOD

INTRODUCTION

An accessory power module is a device that is capable of transforming high-voltage DC electric power to a low-voltage DC electric power to provide electric power to low-voltage electrically-powered devices. When an accessory power module is employed on-vehicle, examples of low-voltage electrically-powered devices include entertainment systems, lighting, electric windows, controllers, etc.

An accessory power module receives high-voltage DC electric power from a high-voltage bus that is coupled to a DC power source. In some applications, the DC power source is configured to provide high-voltage electric power to power one or multiple electric machines via switching inverters. The electric machine may be a motor/generator that generates tractive torque in one operating state and generates electric power in a second operating state, with the switching inverter operating to transform electric power from a DC state to an AC waveform in the tractive torque state, and transform electric power from an AC waveform to a DC state in the generating state. This operation may generate voltage ripples in the electric power on the high-voltage bus, which is experienced by the accessory power module.

Voltage ripples can damage or shorten the service life of power transistors of the accessory power module when the peak magnitude of the voltage ripples exceeds the maximum voltage design level for the power transistors.

There is a need for a system, method and/or apparatus that comprehends the magnitude of the voltage ripples and dynamically controls an accessory power module when the magnitude of the voltage ripples exceeds the maximum voltage design level for the power transistors.

SUMMARY

The concepts described herein provide a method, system and apparatus to control operation of an accessory power module including a DC-to-DC electric power converter, which is an element of a high-voltage electric power system. The accessory power module is controlled in a manner that prevents, avoids, and otherwise precludes exposing high-voltage electronic power switches, e.g., power MOSFET switches, to dynamically changing electric power levels that are greater than a threshold voltage level. The threshold voltage level is based upon a maximum voltage rating for the electronic power switches. The electric power levels that are greater than a threshold voltage level may be transient voltage levels that are caused by voltage ripple induced by another device, e.g., a power inverter, which is electrically connected to the high-voltage electric power system. The benefit of the peak detector method and system of over-voltage shutdown as compared to known heavy filtered method is that peak ripple and the AC gain of the input filter are measured directly. Other methods such as heavy filtered methods require an over-voltage shutdown threshold to be based on the most severe values for peak ripple and AC gain of the high voltage input filter.

An aspect of the disclosure includes an accessory power system electrically coupled to a high voltage input filter downstream from the high-voltage DC power bus and the low-voltage output filter upstream from the low-voltage DC bus. The accessory power system contains an accessory power module having a plurality of primary power switches, a transformer, and a plurality of secondary rectifiers. The plurality of primary power switches are electrically connected to the high voltage input filter downstream from the high-voltage bus, and the plurality of secondary rectifiers are electrically connected to a low-voltage output filter upstream from the low-voltage bus. A peak detector is coupled to the high voltage input filter downstream from the high-voltage bus. A controller is in communication with the peak detector circuit, and operatively connected to the plurality of primary power switches. The controller includes an instruction set that is executable to dynamically monitor, via the peak detector circuit, a ripple voltage of the high-voltage bus multiplied by the AC gain of the high voltage input filter, compare the monitored voltage with a maximum threshold voltage, disable the plurality of primary power switches when the monitored voltage is greater than the maximum threshold voltage, and reactivate the plurality of primary power switches when the monitored voltage of the high-voltage bus is less than the maximum threshold voltage.

Another aspect of the disclosure includes the peak detector being an electrical circuit having an in-line forward-biased diode arranged upstream of a resistor and a capacitor that are arranged in parallel between the diode and a ground, and wherein an RC time constant for the resistor and the capacitor is determined based upon the frequency and magnitude of the ripple voltage and a target recovery time.

Another aspect of the disclosure includes the target recovery time being determined based upon frequency and magnitude of the ripple voltage and the capacity of the low-voltage battery.

Another aspect of the disclosure includes the electrical circuit of the peak detector is implemented as a software routine.

Another aspect of the disclosure includes the electrical circuit of the peak detector is implemented as a plurality of electrical components.

Another aspect of the disclosure includes the plurality of primary power switches being power MOSFET switches, wherein the maximum threshold voltage is determined based upon a maximum voltage rating for the power MOSFET switches.

Another aspect of the disclosure includes the maximum voltage rating for the power MOSFET switches being a maximum drain-to-source voltage.

Another aspect of the disclosure includes an electrical system having a DC power source electrically connected to a power inverter via a high-voltage electrical bus, an accessory power module electrically coupled to the high voltage input filter downstream from the high-voltage bus, an over-voltage shutdown system including a peak detector coupled to the high voltage input filter downstream from the high-voltage bus, a comparator, and a controller. The accessory power module is a DC-to-DC electric power converter having a plurality of primary power switches, a transformer, and a plurality of secondary rectifiers. The plurality of primary power switches are electrically connected to the high voltage input filter downstream from the high-voltage bus. The controller is in communication with the peak detector circuit and is operatively connected to the plurality of primary power switches. The controller includes an instruction set that is executable to dynamically monitor, via the peak detector circuit, a ripple voltage of the high-voltage bus multiplied by the AC gain of the high voltage input filter; compare, via the comparator, the monitored voltage with a maximum threshold voltage; and disable the plurality of primary power switches when the ripple voltage of the high-voltage bus multiplied by the AC gain of the high voltage input filter is greater than the maximum threshold voltage.

Another aspect of the disclosure includes the peak detector being an electrical circuit having an in-line forward-biased diode arranged upstream of a resistor and a capacitor that are arranged in parallel between the diode and a ground, wherein an RC time constant for the resistor and the capacitor is determined based upon the frequency and magnitude of the ripple voltage and a target recovery time.

Another aspect of the disclosure includes an output signal from the peak detector being a first input to the comparator, and the maximum threshold voltage being a second input to the comparator, and an output of the comparator being operatively connected to the plurality of primary power switches of the accessory power module.

Another aspect of the disclosure includes a method for controlling an accessory power module including a plurality of primary power switches, a transformer, and a plurality of secondary rectifiers, wherein the plurality of primary power switches are electrically connected to the high voltage input filter downstream from a high-voltage bus. The method includes dynamically monitoring, via a peak detector circuit, a ripple voltage on the high-voltage bus multiplied by the AC gain of the high voltage input filter; comparing the monitored voltage with a maximum threshold voltage for the plurality of primary power switches; and disabling the plurality of primary power switches when the monitored voltage is greater than the maximum threshold voltage.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
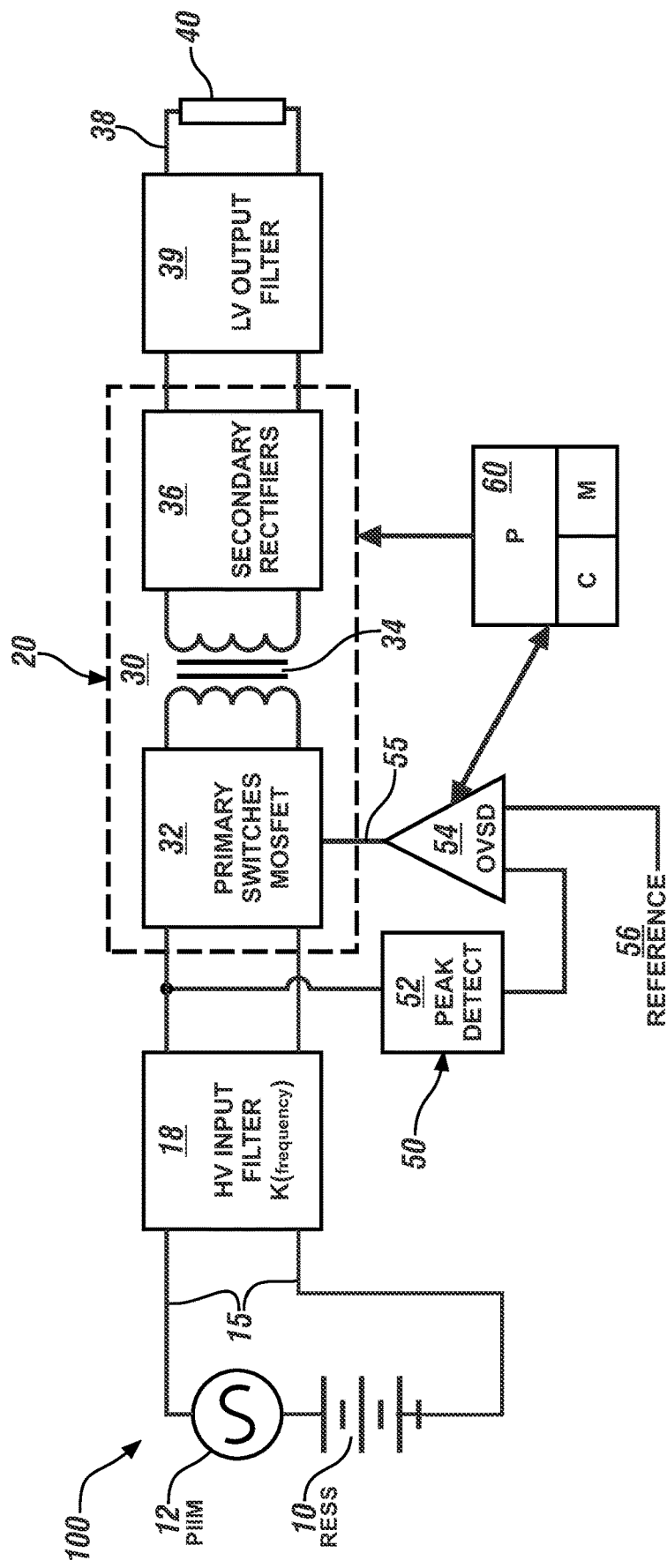
FIG. 1 schematically illustrates a high-voltage electric power system including an accessory power module having a DC-to-DC electric power converter, in accordance with the disclosure.
Figure 2:
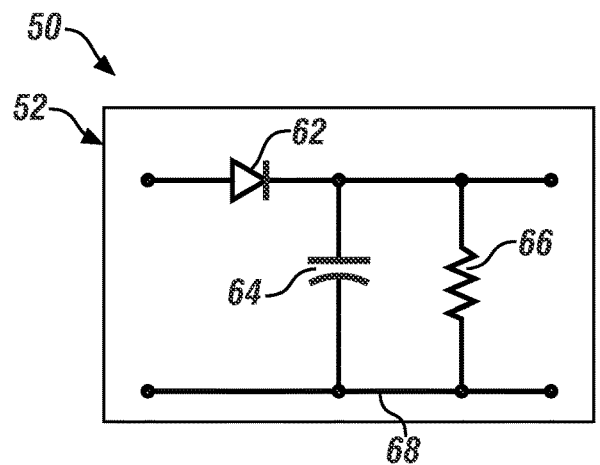
FIG. 2 schematically illustrates a peak detector circuit, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. It should be understood that throughout the drawings, corresponding reference numerals indicate like or corresponding parts and features.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Furthermore, exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with any number of mechanical and/or electronic systems, and that the systems described herein are merely exemplary embodiment of possible implementations. For the sake of brevity, known components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

As employed herein, the term "upstream" and related terms refer to elements that are towards an origination of a flow stream relative to an indicated location, and the term "downstream" and related terms refer to elements that are away from an origination of a flow stream relative to an indicated location.

The use of ordinals such as first, second and third does not necessarily imply a ranked sense of order, but rather may distinguish between multiple instances of an act or structure.

The phrase "operatively connected" is a general descriptive term that reflects a functional relationship between claimed elements that are connected in a way to perform a designated function.

Referring now to the drawings, which are provided for the purpose of illustrating certain exemplary embodiments and not for the purpose of limiting the same, FIG. 1 schematically illustrates an electrical system 100 including a rechargeable electrical energy storage system (RESS) 10, a high-voltage DC power bus 15, a power inverter 12, and an accessory power system 20. In one embodiment, the electrical system 100 may be arranged as part of an electric drive system on a vehicle, although the concepts described herein are not so limited. In such instances, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electrical system 100 may be arranged to supply torque to a stationary system. The electrical system 100 may take many different forms and have additional components.

The RESS 10 is a rechargeable DC power source in one embodiment, and may include battery cells of various chemistries, e.g., lithium-metal-based devices. The RESS 10 supplies high-voltage DC electric power to the high-voltage DC power bus 15, which is connected to the power inverter 12 and the accessory power system 20 through a high voltage input filter 18. A high-voltage DC electric power refers to a nominal 300V system, a nominal 480V system, or another DC voltage system. The high-voltage DC power bus 15 may contain a significant magnitude of AC voltage ripple that may be generated by operation of the power inverter 12 under certain operating conditions, such as regenerative braking, uncontrolled generation, etc.

The power inverter (PIM) 12 is a multi-phase inverter that transforms DC electric power to AC electric power that is used to control operation of an electric machine such as a motor/generator. In some embodiments, the power inverter 12 may be part of a power inverter module that powers a rotary electric machine to provide tractive power for an electric vehicle. A single power inverter 12 is illustrated. It is appreciated that there may be multiple power inverters that supplied high-voltage DC electric power from the high-voltage DC power bus 15.

The power inverter 12 is configured with control circuits including power transistors, e.g., IGBTs for transforming high-voltage DC electric power to high-voltage AC electric power and transforming high-voltage AC electric power to high-voltage DC electric power. In one embodiment, the power inverter 12 may employ pulsewidth-modulating (PWM) control of the IGBTs to convert stored DC electric power originating in the rechargeable energy storage unit 10 to AC electric power to drive a rotary electric machine to generate torque. Similarly, the power inverter 12 may convert mechanical power transferred to a rotary electric machine to DC electric power to generate electric energy that is storable in the rechargeable energy storage unit 10, including as part of a regenerative braking control strategy. The power inverter 12 receives motor control commands and controls inverter states to provide the motor drive and regenerative braking functionality.

The accessory power system 20 includes an accessory power module 30 and an overvoltage system 50. The accessory power module 30 is a DC-to-DC electric power converter that includes a plurality of primary power switches 32, a transformer 34, and a plurality of secondary rectifiers 36. An accessory power module controller 60 is operatively connected to the plurality of primary power switches 32 to control activation and deactivation thereof. The accessory power module controller 60 is also able to disable the plurality of primary power switches 32. In one embodiment, the plurality of primary power switches 32 are power MOSFET switches, which have a maximum voltage rating. In one embodiment, the maximum voltage rating is a maximum drain-to-source voltage. As appreciated by those skilled in the art, operating a power MOSFET switch at a voltage level that is greater than its maximum voltage rating can substantially reduce its service life.

The plurality of primary power switches 32 are electrically connected to the high voltage input filter 18 downstream of high-voltage DC power bus 15. The plurality of secondary rectifiers 36 are electrically connected to a low-voltage output filter 39 being deployed in-line to filter electrical noise which is upstream of low-voltage electric power bus 38. The accessory power module 30 transforms the high-voltage DC electric power from the high-voltage DC power bus 15 to a low-voltage DC electric power, which is distributed via the low-voltage electric power bus 38. When employed on a vehicle, the low-voltage electric power bus 38 supplies low-voltage DC electric power to one or multiple low-voltage devices and systems 40 on the vehicle, including, e.g., a low-voltage battery, electric windows, HVAC fans, seats, starter, interior and exterior lighting, and an ignition system. In one embodiment, low-voltage DC electric power refers a nominal 12V voltage level. Alternatively, low-voltage DC electric power may be another voltage level, such as 24V, or 36V, or 48V. Sensors and other monitoring elements (not shown) may be arranged to monitor electrical parameters (e.g., voltage, current) at various locations, and mechanical parameters (e.g., speed) at various other locations.

The overvoltage system 50 includes, in one embodiment, a peak detector 52 that is coupled to the high voltage input filter 18 downstream of the high-voltage DC power bus 15, and an overvoltage shutdown (OVSD) comparator 54. Operation of the elements of the overvoltage system 50 are controlled by the accessory power module controller 60 in one embodiment.

The accessory power module controller 60 monitors an input from the overvoltage system 50, and controls activation and deactivation of the plurality of primary power switches 32. The overvoltage system 50 operates to protect the power devices, e.g., the primary power switches 32 of the accessory power module 30, in the presence of high-voltage electric power on the high-voltage DC power bus 15, such as AC ripple that is generated by operation of the power inverter 12.

As shown with reference to FIG. 1, the peak detector 52 is an electrical circuit having an in-line forward-biased diode 62 arranged upstream of a resistor 64 and a capacitor 66 that are arranged in parallel between the diode 62 cathode and ground 68. The RC time constant and the corresponding magnitudes for the resistor 64 and the capacitor 66 are determined based upon the frequency and magnitude of the ripple voltage and a target recovery time. In one embodiment, the electrical circuit of the peak detector 52 is implemented as a software routine in the accessory power module controller 60. Alternatively, the electrical circuit of the peak detector 52 is implemented as a plurality of electrical components that are arranged on a circuit board. In either configuration, a voltage output from the peak detector 52 is provided as an input to the OVSD comparator 54.

The peak detector method captures both the DC and AC components of the bus voltage and the AC gain of the high voltage input filter. The capacitor rapidly charges the OVSD signal during positive excursions, and the diode reverse biases during negative excursions. The OVSD recovery can be controlled by adjusting the RC time constant.

The OVSD comparator 54 has inputs of the voltage output from the peak detector 52 and a reference threshold voltage 56, and has a discrete output of "1" or "0", which is provided as an input 55 to the accessory power module controller 60 to control the plurality of primary power switches 32. When the voltage output from the peak detector 52 is less than the reference threshold voltage 56, the OVSD comparator 54 generates a discrete output of "0", which allows the accessory power module controller 60 to control the plurality of primary power switches 32 to operate in an expected manner. When the voltage output from the peak detector 52 greater than the reference threshold voltage 56, the OVSD comparator 54 generates a discrete output of "1", which causes the accessory power module controller 60 to disable the plurality of primary power switches 32, thus preventing an overvoltage condition.

The reference threshold voltage 56 is a calibratable value and is set not to exceed the maximum voltage rating for the power MOSFET switches, which is a maximum drain-to-source voltage in one embodiment.

The primary power switches 32 are disabled to prevent damage from exceeding component voltage breakdown rating. Disabling the primary power switches 32 increases the voltage margin by eliminating overshoot that occurs during turn on and turn off.

The target recovery time is determined based upon a DC component of the high voltage source combined with the frequency and magnitude of the ripple voltage and a capacity of a low-voltage battery that is part of the low-voltage devices and systems 40 that are electrically connected to the low-voltage bus 38 downstream from the low-voltage output filter 39.

The reference threshold voltage 56 used with the peak detector method includes sufficient margin to protect for worst case switching overshoot. This is in contrast to a reference threshold voltage that is used with a known heavy filtered method, which includes sufficient margin to protect for worst case switching overshoot, PIM ripple and AC gain of the accessory power module high voltage filter.

The peak detector 52 detects both the DC and AC components of the bus voltage 15 and the AC gain of the high voltage input filter 18. If the detected voltage exceeds a threshold set by accessory power module design, then the accessory power module controller will issue a signal to shut down the accessory power module. This action serves to extend the operating range by having a higher fidelity voltage measurement as compared with existing strategies, which use low bandwidth measurement to prevent nuisance trips.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

Figure 3:
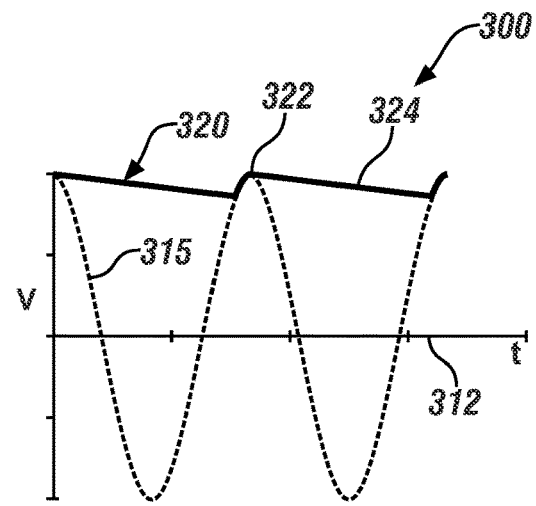
FIG. 3 graphically illustrates voltage ripple that may occur on a high-voltage power bus, along with operation of an embodiment of the peak detector circuit, in accordance with the disclosure.

FIG. 3 graphically illustrates a time-based voltage ripple 315 that may occur on a high-voltage DC power bus 15 multiplied by the AC gain of the high voltage input filter 18 that supplies electric power to an embodiment of the accessory power system 20 described herein. Also depicted is a signal output from an embodiment of the peak detector 52, illustrated as line 320. The voltage ripple 315 is a combination of a HV bus maximum DC voltage 312, a HV bus voltage ripple, and the AC gain of the high voltage input filter 18. The signal output from the peak detector circuit 50 (line 320) includes a maximum voltage 322, and a decay voltage 324, which is associated with the OVSD recovery, which can be controlled by adjusting the RC time of the peak detector 52, i.e., adjusting the resistor 64 and/or the capacitor 66. This arrangement precludes a need for introducing hysteresis into the overvoltage circuit 50 or the operation of the controller 60.

Figure 4:
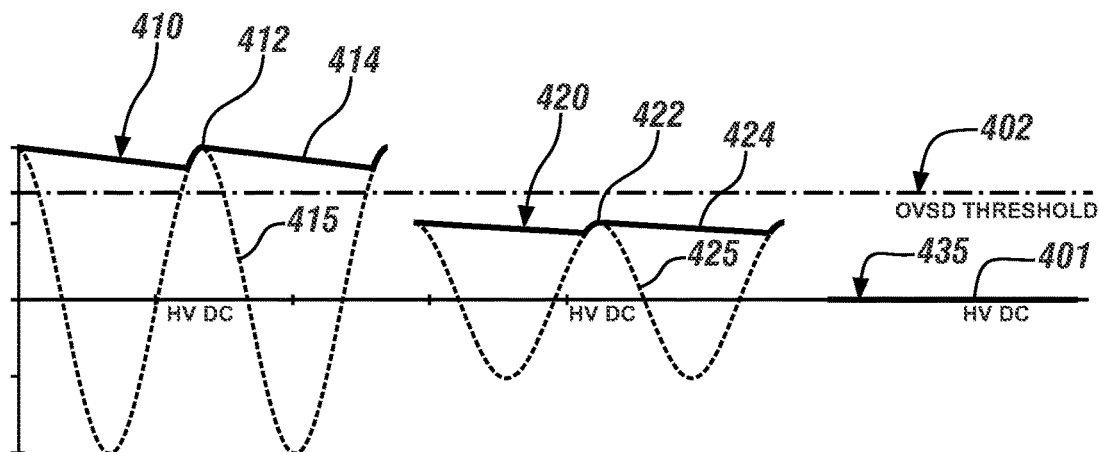
FIG. 4 graphically illustrates levels of voltage ripple that may occur on a high-voltage power bus, along with operation of an embodiment of the peak detector circuit, in accordance with the disclosure.

FIG. 4 graphically illustrates levels of voltage ripple that may occur on a high-voltage power bus, along with operation of an embodiment of the peak detector circuit, in accordance with the disclosure. Horizontal lines include a nominal voltage level 401 on the high-voltage DC power bus 15, and an OVSD threshold voltage 402. Line 410 represents voltage levels that include a high level of voltage ripple 415, with peak 412 and decay 414, both of which are greater than the OVSD threshold voltage 402, which prompts the accessory power module controller 60 to disable operation of the plurality of primary power switches 32. Line 420 represents voltage levels that include a moderate or light level of voltage ripple 425, with peak 422 and decay 424, both of which are less than the OVSD threshold voltage 402. In this situation, the accessory power module controller 60 permits operation of the plurality of primary power switches 32. Line 435 represents voltage levels that includes no voltage ripple, and is less than the OVSD threshold voltage 402. In this situation, the accessory power module controller 60 permits operation of the plurality of primary power switches 32.

Figure 5:
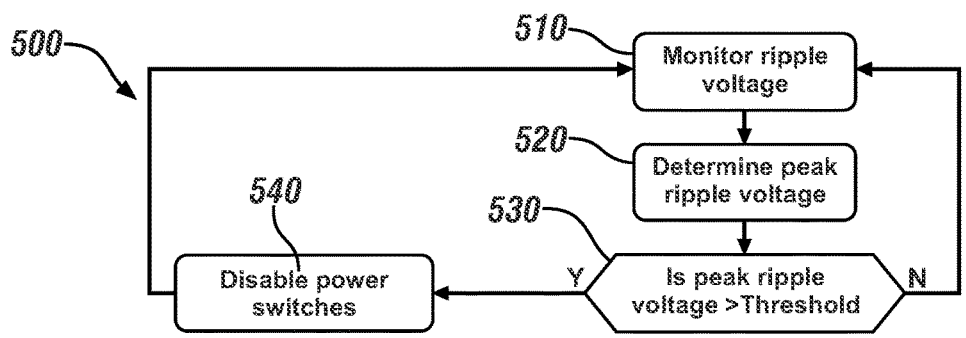
FIG. 5 schematically illustrates a process for controlling operation of an embodiment of the high-voltage electric power system an accessory power module having a DC-to-DC electric power converter, in accordance with the disclosure.

FIG. 5 schematically illustrates a process 500 for controlling operation of an embodiment of the high-voltage electric power system 100 including an accessory power module 20 having a DC-to-DC electric power converter 30, which is described with reference to FIG. 1. The method includes dynamically monitoring, via a peak detector circuit, a ripple voltage on the high-voltage bus multiplied by an AC gain of the high voltage input filter (510) to determine a peak ripple voltage (520). The peak ripple voltage on the high-voltage bus multiplied by the AC gain of the high voltage input filter is compared with a maximum threshold voltage for the plurality of primary power switches (530). When the ripple voltage on the high-voltage bus multiplied by the AC gain of the high voltage input filter is greater than the maximum threshold voltage (530)(Y), the plurality of primary power switches are disabled (540). The plurality of primary power switches are reactivated when the ripple voltage of the high voltage bus multiplied by the AC gain of the high voltage input filter is less than the maximum threshold voltage (530)(N), and monitoring continues (510).

Thus, a method, system and apparatus for controlling operation of the accessory power module including the DC-to-DC electric power converter is described. The accessory power module is controlled in a manner that prevents, avoids, and otherwise precludes exposing high-voltage electronic power switches, e.g., power MOSFET switches, to dynamically changing electric power levels that are greater than a threshold voltage level. The threshold voltage level is based upon a maximum voltage rating for the electronic power switches. The electric power levels that are greater than a threshold voltage level may be transient voltage levels that are caused by voltage ripple induced by another device, e.g., a power inverter, which is electrically connected to the high-voltage electric power system.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, which is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An accessory power system electrically coupled to a high voltage input filter downstream from a high-voltage bus, comprising:
    an accessory power module, including a plurality of primary power switches, a transformer, and a plurality of secondary rectifiers; wherein the plurality of primary power switches are electrically connected to the high voltage input filter downstream from the high-voltage bus, and wherein the plurality of secondary rectifiers are electrically connected to a low-voltage output filter downstream from a low-voltage bus;
    a peak detector coupled to the high voltage input filter downstream from the high-voltage bus; and
    a controller, in communication with the peak detector, and operatively connected to the plurality of primary power switches;
    the controller including an instruction set that is executable to:
        dynamically monitor, via the peak detector, a ripple voltage of the high-voltage bus multiplied by an AC gain of the high voltage input filter;
        compare the monitored voltage with a maximum threshold voltage;
        disable the plurality of primary power switches when the monitored voltage is greater than the maximum threshold voltage; and
        reactivate the plurality of primary power switches when the monitored voltage is less than the maximum threshold voltage.

2. The accessory power system of claim 1, wherein the peak detector comprises an electrical circuit having an in-line forward-biased diode arranged upstream of a resistor and a capacitor that are arranged in parallel between the diode and a ground, and wherein an RC time constant for the resistor and the capacitor is determined based upon frequency and magnitude of the ripple voltage and a target recovery time.

3. The accessory power system of claim 2, wherein the target recovery time is determined based upon a DC component of the high voltage bus combined with the frequency and magnitude of the ripple voltage and a capacity of a low-voltage battery that is electrically connected to the low-voltage output filter downstream from the low-voltage bus.

4. The accessory power system of claim 2, wherein the electrical circuit of the peak detector is implemented as a software routine.

5. The accessory power system of claim 2, wherein the electrical circuit of the peak detector is implemented as a plurality of electrical components.

6. The accessory power system of claim 1, wherein the plurality of primary power switches comprise power MOSFET switches, and wherein the maximum threshold voltage is determined based upon a maximum voltage rating for the power MOSFET switches.

7. The accessory power system of claim 6, wherein the maximum voltage rating for the power MOSFET switches comprises a maximum drain-to-source voltage.

8. An electrical system, comprising:
    a DC power source electrically connected to a power inverter via a high-voltage electrical bus;
    an accessory power module electrically coupled to high voltage input filter downstream of a high-voltage bus; and an overvoltage shutdown system including a peak detector coupled to the high voltage input filter downstream from the high-voltage bus, a comparator, and a controller;

wherein the accessory power module includes a DC-to-DC electric power converter having a plurality of primary power switches, a transformer, and a plurality of secondary rectifiers;

wherein the plurality of primary power switches are electrically connected to the high voltage input filter downstream of the high-voltage bus;

wherein the accessory power module is coupled to a low-voltage electric power bus;

wherein the controller is in communication with the peak detector and is operatively connected to the plurality of primary power switches;

the controller including an instruction set that is executable to:
dynamically monitor, via the peak detector, a ripple voltage on the high-voltage bus multiplied by an AC gain of the high voltage input filter;
compare, via the comparator, the voltage on the high-voltage bus multiplied by the AC gain of the high voltage input filter with a maximum threshold voltage; and
disable the plurality of primary power switches when the monitored voltage of the high-voltage bus is greater than the maximum threshold voltage.

9. The electrical system of claim 8, wherein the peak detector comprises an electrical circuit having an in-line forward-biased diode arranged upstream of a resistor and a capacitor that are arranged in parallel between the diode and a ground, and wherein an RC time constant for the resistor and the capacitor is determined based upon a frequency and magnitude of the ripple voltage and a target recovery time.

10. The electrical system of claim 9, wherein the target recovery time is determined based upon the frequency and magnitude of the ripple voltage and a storage capacity of a low voltage battery of the low-voltage electric power bus.

11. The electrical system of claim 9, wherein the peak detector is implemented as a software routine.

12. The electrical system of claim 9, wherein the peak detector is implemented as an electrical component circuit.

13. The electrical system of claim 8, wherein an output signal from the peak detector is a first input to the comparator, wherein the maximum threshold voltage is a second input to the comparator, and wherein an output of the comparator is operatively connected to the plurality of primary power switches of the accessory power module.

14. The electrical system of claim 8, wherein the plurality of primary power switches comprise power MOSFET switches, and wherein the maximum threshold voltage is determined based upon a maximum voltage rating for the power MOSFET switches.

15. The electrical system of claim 14, wherein the maximum voltage rating for the power MOSFET switches comprises a maximum drain-to-source voltage.

16. The electrical system of claim 8, wherein the instruction set is executable to reactivate the plurality of primary power switches when the ripple voltage on the high-voltage bus multiplied by the AC gain of the high voltage input filter is less than the maximum threshold voltage.

17. A method for controlling an accessory power module including DC-to-DC electric power converter having a plurality of primary power switches, a transformer, and a plurality of secondary rectifiers, wherein the plurality of primary power switches are electrically connected to a high voltage input filter downstream from a high-voltage bus, the method comprising:
dynamically monitoring, via a peak detector circuit, a ripple voltage on the high-voltage bus multiplied by an AC gain of the high voltage input filter;
comparing the ripple voltage on the high-voltage bus multiplied by the AC gain of the high voltage input filter with a maximum threshold voltage for the plurality of primary power switches; and
disabling the plurality of primary power switches when the ripple voltage on the high-voltage bus multiplied by the AC gain of the high voltage input filter is greater than the maximum threshold voltage.

18. The method of claim 17, further comprising reactivating the plurality of primary power switches when the ripple voltage of the high voltage bus multiplied by the AC gain of the high voltage input filter is less than the maximum threshold voltage.

19. The method of claim 17, wherein the plurality of primary power switches comprise power MOSFET switches, and wherein the maximum threshold voltage is determined based upon a maximum voltage rating for the power MOSFET switches.

20. The method of claim 19, wherein the maximum voltage rating for the power MOSFET switches comprises a maximum drain-to-source voltage.

\* \* \* \* \*